(12) United States Patent
de Lasa et al.

(10) Patent No.: US 6,852,668 B2
(45) Date of Patent: Feb. 8, 2005

(54) CATALYST FOR HYDROCARBON REFORMING REACTION

(75) Inventors: Hugo Ignacio de Lasa, London (CA); Tarek Ei Solh, London (CA); Kai Jarosch, London (CA)

(73) Assignee: University of Western Ont, London (CA)

(*) Notice: Subject to any disclaimer, the term of this patent is extended or adjusted under 35 U.S.C. 154(b) by 0 days.

(21) Appl. No.: 09/998,222

(22) Filed: Dec. 3, 2001

(65) Prior Publication Data

US 2003/0103893 A1 Jun. 5, 2003

(51) Int. Cl.[7] .............................................. B01J 23/755
(52) U.S. Cl. ....................... 502/337; 502/335; 423/651; 423/653; 252/373
(58) Field of Search ..................... 252/373; 423/651, 423/653; 502/335, 337

(56) References Cited

U.S. PATENT DOCUMENTS

| | | | |
|---|---|---|---|
| 4,280,820 A | | 7/1981 | Banks et al. ............... 48/214 A |
| 4,285,837 A | | 8/1981 | Sato et al. ................ 252/466 J |
| 4,605,676 A | * | 8/1986 | Kobylinski et al. .......... 518/700 |
| 4,863,712 A | | 9/1989 | Twigg et al. ................ 423/651 |
| 4,990,481 A | | 2/1991 | Sato et al. .................... 502/335 |
| 5,100,857 A | | 3/1992 | Sato et al. .................... 502/335 |
| 5,326,550 A | | 7/1994 | Adris et al. .................. 423/652 |
| 5,714,092 A | * | 2/1998 | van Looij et al. ........... 252/373 |
| 6,238,549 B1 | * | 5/2001 | Viltard et al. ................. 208/93 |

FOREIGN PATENT DOCUMENTS

| | | |
|---|---|---|
| EP | 0 114 704 B1 | 1/1984 |
| EP | 0 465 062 A2 | 6/1991 |
| EP | 0 624 400 | 5/1994 |
| JP | 09025101 A * | 1/1997 |
| WO | WO 9849097 | 11/1998 |

OTHER PUBLICATIONS

P., Orphanides, Ammonia Plant Safety and Related Facilities, The American Institute of Chemical Engineers, New York, v34, 1994.
C. N., Satterfield, Heterogeneous Catalysis in Industrial Practice, McGraw Hill, Inc. New York, 1991.
A., M., Adris, S.S.E.E., Elnashaie, R., Hughes, "A Fluidized Membrane Reactor for the Steam Reforming of Methane", Can. J. Chem. Eng., vol. 69, p. 1061, 1991.
A.M., Adris, C.J., Lim, J.R., Grace, "The Fluidized–Bed Membrane Reactor for Steam Reforming of Methane: Model Verification and Parametric Study", Chem. Eng. Sci., vol. 52, p. 1609, 1997.

(List continued on next page.)

Primary Examiner—Stuart L. Hendrickson
Assistant Examiner—Peter J Lish
(74) Attorney, Agent, or Firm—C. A. Rowley (57) ABSTRACT

A Nickel (Ni) catalyst for facilitating a hydrocarbon reforming process, and an improved process based on the catalyst. The catalyst comprising discrete Ni crystallites having a size in the range of between 150 and 250 Å and a distribution on said support element of no more than 0.14 square meters of exposed nickel/square meter of support.

5 Claims, 8 Drawing Sheets

OTHER PUBLICATIONS

K., Jarosch, Novel Inconel Supported Palladium Membranes For Hydrogen Separation: Development, Modeling, and Implication For The Catforming Process, M.E.Sc. Thesis, University of Western Ontario, London, Ontario, 1995.

T., El Solh, Heterogeneous Catalyst for Methane Reforming, M.E.Sc. Thesis, University of Western Ontario, London, Ontario, 1998.

K., Jarosch, Steam reforming of Methane in a Fast Fluidized Membrane Reactor, Ph.D. Thesis, University of Western Ontario, London, Ontario, 2000.

K., Jarosch, H.I., de Lasa, "Novel Riser Simulator for Methane Reforming using High Temperature Membranes", Chem. Eng. Sci., vol. 54, p. 1455, 1999.

J.R., Rostrup–Nielsen, Catalysis Science and Technology, vol. 5, Anderson, J., Boudart, M. (eds.), Springer–Verlag, 1984.

E., Kuijpers, J., Jansen, A.J., van Dillen, J.W., Geus, "The Reversible Decomposition of Methane on a Ni/SiO2 Catalyst", Journal of Catalysis, vol. 72, p. 75, 1981.

M., Verhaak, A., van Dillen, J., Geus, "Measuring the Acid–Base Properties of Supported Nickel Catalysts Using Temperature–Programmed Desortpion of Ammonia", Applied Catalysis A: General, vol. 105, p. 251, 1993.

F., Arena, B., Horrell, D., Cocke, A., Parmaliana, N., Giordano, "Magnesia–Supported Nickel Catalysts: I. Factors affecting the structure and Morphological Properties", Journal of Catalysis, vol. 132, p. 58, 1991.

A., Parmaliana, F., Arena, F., Frusteri, S., Coluccia, L., Marchese, G., Martra, A., Chuvilin, "Magnesia–Supported Nickel Catalysts: II. Surface Properties and Reactivity in Methane Steam Reforming", Journal of Catalysis, vol. 141, p. 34, 1993.

T., Tsuchida, "Preparation of high surface area $\alpha$–$Al_2O_3$ and its surface properties", Applied Catalysis, A, vol. 105, p. 141, 1993.

C.V., McDaniel, P.K., Maher, "Zeolite stability and ultra stable zeolites", Zeolite Chemistry and Catalysis, vol. 4, p. 225, 1984.M., Iwamoto, T., Hasuwa, H., Furukawa, S., Kagawa, "Water Gas Shift Reaction Catalyzed by Metal Ion–exchanged Zeolites", Journal of Catalysis, vol. 79, p. 291, 1983.

B., Gustafson, J., Lunsford, "The Catalytic Reaction of CO and $H_2O$ over Ruthenium in a Y–Type Zeolite", Journal of Catalysis, vol. 78, p. 393, 1982.

El Solh T., Jarosch K., de Lasa H., "Fluidizable Catalyst for Methane Steam Reforming", Applied Catalysis, 210, 315–324 (2001).

K. Hou and R. Hughes "The Kinetics of methane steam reforming over a Ni/$\alpha$–$Al_2O$ catalyst" Chemical Engineering Journal 82 (2001) 311–328.

* cited by examiner

Figure 4 o Crystal size=179 A, Dispersion=0.14 m²Ni/m²support
□ Crystal size= 529 A, Dispersion=0.058 m²Ni/m²support
Δ Crystal size=1929 A, Dispersion=0.04 m²Ni/m²support

1. USY, Crystal size=40A, Dispersion=0.05 $m^2Ni/m^2$support; T=750 C, 60 psi, 40 s.
2. USY, Crystal size=40A, Dispersion=0.05 $m^2Ni/m^2$support; T=750 C, 95 psi, 15s.
3. USY, Crystal size=40A, Dispersion=0.05 $m^2Ni/m^2$support; T=750 C, 92 psi, 15s.

Note: Dry reforming of methane using USY zeolites. The left hand side bars represent chemical equilibrium values the right hand side bars the actual methane conversion values in the riser simulator. Note that the CH4/CO2 ratios for all these runs are 1.

Figure 8

CATALYST FOR HYDROCARBON REFORMING REACTION

FIELD OF INVENTION

The present invention relates to a catalyst for reforming more particularly the present invention relates to a fluidizable Nickel catalyst for methane reforming.

BACKGROUND OF THE INVENTION

Reformating reactions for materials such as methane may be carried in a dry reforming process or a steam reforming process and may use a fixed bed or a fluidized bed. Steam reforming of methane is a process in which methane is brought into contact with steam at high temperature (1100 K) and pressure (3000 kPa) over a catalyst. The result is the production of a mixture of CO, $CO_2$ and $H_2$, commonly referred to as synthesis gas or syngas. Steam reforming of methane is the major source of synthesis gas for the production of chemicals such as methanol and ammonia and is the primary source of syngas for hydrogen production. On the industrial scale, steam reforming of methane is carried out in fixed bed reactors using a catalyst composed of nickel dispersed on a monolithic support such as α-alumina or magnesia see for example C. N., Satterfield, Heterogeneous Catalysis in Industrial Practice, McGraw Hill, Inc. New York, 1991. Steam to methane ratios in excess of 3:1 are used in order to promote high conversions of methane and limit the production of coke.

Recently, the use of reactors that combine hydrogen permeable membranes with fluidized beds for the steam reforming of methane has been growing. In light of this, a new process concept has been developed at the Chemical Reactor Engineering Centre located at the University of Western Ontario (CREC-UWO). This process called (Catforming, combines composite palladium/inconel hydrogen permeation membranes with steam reforming carried out in a circulating fluidized bed reactor (see K., Jarosch, Novel Inconel Supported Palladium Membranes For Hydrogen Separation:. Development, Modeling, and Implication For The CATFORMING Process, M.E.Sc. Thesis, University of Western Ontario, London, Ontario, 1995; T., El Solh, Heterogeneous Catalyst for Methane Reforming, M.E.Sc. Thesis, University of Western Ontario, London, Ontario, 1998: K., Jarosch, Steam Reforming of Methane in a Fast Fluidized Membrane Reactor, Ph.D. Thesis, University of Western Ontario, London, Ontario, 2000: and K., Jarosch, H. I., de Lasa, "Novel Riser Simulator for Methane Reforming using High Temperature Membranes", Chem. Eng. Sci., vol54, pg. 1455, 1999. U.S. Pat. No. 5,326,550 issued Jul. 5, 1994 to All-Eldin et al. describes a similar process.

In the Catformer process, the reactant gases, steam and methane, are brought into contact with a fluidizable catalyst and the resultant gas-solid suspension is allowed to flow down a reactor tube(s). As the suspension flows down the tube(s), the reforming and water-gas shift reactions take place. Some portion of the tube is to be made of Inconel supported palladium hydrogen permeation membrane allowing the hydrogen to permeate from the reaction zone (see the Jarosch references referred to in the preceding paragraph). After the suspension leaves the reaction zone the catalyst is separated from the product synthesis and the catalyst recirculated to the reactor. Removal of the hydrogen is considered beneficial as follows: a) it allows increased syngas conversion above equilibrium values (supra-equilibrium syngas conversion), b) its favorably affects selectivity (H2/CO ratio), c) it produces pure hydrogen in the membrane permeate side.

Although the Catformer is to be operated at thermodynamic equilibrium, under conditions unfavorable to carbon formation (coke), coke will be generated by kinetic processes. Therefore, the catalyst or some fraction of the catalyst will require periodic regeneration. The regeneration stage, involving coke combustion, will also oxidize the metallic component of the catalyst. It is thus, expected that in the Catforming or parent processes, the fluidizable catalyst will evolve through steps involving coking, regeneration, and reduction. As a result a suitable fluidizable catalyst will have to stand the sequential oxidation and reduction cycles.

A reforming catalyst typically consists of two primary components, the catalyst itself (a metal in the reduced state) and the appropriate catalyst support over which the active metal can be dispersed. The metals in group VIII are active for reforming as are the noble metals. However, economic considerations preclude the use of the noble metals and of the group VIII metals, only Ni has the suitable resistance to oxidation see J. R., Rostrup-Nielsen, Catalysis Science and Technology, vol5, Anderson, J., Boudart, M. (eds.), Springer-Verlag, 1984. The catalyst support is an important catalyst design parameter. Supports have to be mechanically strong, stable under steam atmospheres, high temperatures (750–850° C.) and resistant to metal-support interactions. E., Kuijpers, J., Jansen, A. J., van Dillen, J. W., Geus, "The Reversible Decomposition of Methane on a Ni/SiO2 Catalyst", Journal of Catalysis, vol72, pg. 75, 1981 and M., Verhaak, A., van Dillen, J., Geus, "Measuring the Acid-Base Properties of Supported Nickel Catalysts Using Temperature-Programmed Desorption of Ammonia", Applied Catalysis A: General, vol105, pg. 251, 1993 have reported the use of silica ($SiO_2$) as a support. However, the inclusion of silica is generally avoided as it can be volatilized under reforming conditions see the J. R., Rostrup-Nielsen paper referred to above F., Arena, B., Horrell, D., Cocke, A., Parmaliana, N., Giordano, "Magnesia-Supported Nickel Catalysts: I. Factors affecting the structure and Morphological Properties", Journal of Catalysis, vol132, pg. 58, 1991 and A., Parmaliana, F., Arena, F., Frusteri, S., Coluccia, L., Marchese, G., Martra, A., Chuvilin, "Magnesia-Supported Nickel Catalysts: II. Surface Properties and Reactivity in Methane Steam Reforming", Journal of Catalysis, vol141, pg. 34, 1993 reported on their investigations of the use of magnesia (MgO) as a catalyst. Even though this type of catalyst was found to be both active and stable, magnesia showed an important drawback: as calcination temperature increased, the amount of available nickel was reduced. This was attributed to the presence of free magnesia in the support which, when hydrated, formed a non-reducible NiO—MgO solid phase.

Given all these facts, α-alumina, formed by the decomposition of hydrated alumina is a preferred support as it is mechanically strong at 1200° C., as required by the conditions of methane reforming (see T., Tsuchida, "Preparation of high surface area (α-$Al_2O_3$ and its surface properties", Applied Catalysis, A, vol105, pg. 141, 1993).

Faujasites have been shown to be effective in several catalytic applications. The basic building block of the faujasite is a truncated octahedron that is connected at four of the hexagonal faces by hexagonal prismatic structures of $AlO^-_4$ and $SiO_4$ tetrahedra. The three dimensional framework includes elliptically shaped cavities approximately 12 Å in diameter called super cages. The Y-type zeolites with high (1.5–3.0) Si/Al ratios, 300 to 800 $m^2/g$ surface areas, are preferred given the thermal stability and the high catalytic activity. See C. V., McDaniel, P. K., Maher, "Zeolite stability and ultra stable zeolites", Zeolite Chemistry and Catalysis, vol 4, pg. 225, 1984?]

Only a few studies of methane reforming have been conducted using nickel supported on zeolites see M., Iwamoto, T., Hasuwa, H., Furukawa, S., Kagawa, "Water Gas Shift Reaction Catalyzed by Metal Ion-exchanged Zeolites", Journal of Catalysis, vol79, pg. 291, 1983 and B., Gustafson, J., Lunsford, "The Catalytic Reaction of CO and $H_2O$ over Ruthenium in a Y-Type Zeolite", Journal of Catalysis, vol78, pg. 393, 1982. [16, 17].

These studies suggest that higher activity can be attained using zeolitic supports. In addition to higher activity, zeolitic supports have the potential to deliver very high metal dispersion that is stable combined with a low potential for support metal interaction.

There are many patents on catalysts that describe various catalyst structures for example U.S. Pat. No. 4,280,820 issued Jul. 28, 1981 describes a catalyst for use in the production of methane producing gases. This catalyst is formed by coprecipitation of Nickel Ni and alumina with in its unreduced precursor with a 12 to 120 Angstrom pores (Å) and has at least 55% of the pore volume in the 12 to 30 Å range and wherein the pore volume formed by pores with a radius of 10 to 50 Å is at least 80% of the total pore volume U.S. Pat. Nos. 4,990,481 issued Feb. 5, 1991 and 5,100,857 issued Mar. 31, 1992 to Sato et al each describes a catalyst formed by immersing the alumina particles in a Ni containing solution, drying and then calcining to produce a catalyst where the alumina has a pore size in the order of about 1000 Å to 5000 Å. It will be noted that these patents do not describe the size of the Ni crystallites.

EPO patent 114704 describes the formation of catalyst for hydrogenation reactions wherein a Ni catalyst on a suitable carrier is formed in a multi step process. The crystallite size of the Ni/Ni compound used is less than 10 nanometers.

WO 9849097 A1 of Hershkowitz published Nov. 5, 1998 describes a fluidized bed process and apparatus for producing synthesis gas discusses the use of catalyst with crystallites supported in the surface of 30 to 150 micron particles in concentrations ranging from 0.1 to 90% Ni based on the total weight of the mixture. This patent is particularly concerned with "the importance of Nickel loadings below 5%" to prevent the 30 to 150 micron "particle agglomeration" in the fluidized bed.

BRIEF DESCRIPTION OF THE PRESENT INVENTION

It is an object of the present invention to provide an improved process and catalyst for hydrocarbon reforming processes.

It is an object of the invention to provide improved catalysts that improves the reforming reaction and is capable of maintaining a major portion of its activity after being subject to a recovery operation for recovering the catalyst for recycle to the process.

It is a further object of this invention to provide a catalyst for an improved reforming processes incorporating regeneration of the catalyst.

It is a further object of this invention to provide a fluidizable catalyst for improved fluidized bed reforming processes.

It is yet another objective of the present invention to provide a fluidizable catalyst specially adapted for use in an improved methane steam reforming process.

Broadly the present invention relates to a regeneratable Nickel (Ni) catalyst particulary suited for a hydrocarbon reforming process, said catalyst comprising discrete Ni crystallites formed on a suitable support element by a several incipient wetness steps process and capable of withstanding at least 6 catalyst regenerations without significantly inhibiting it's catalytic activity in said reforming process, said Ni crystallites being positioned in the inner surface of said suitable support element. said crystallites having an average maximum dimension measured in any one direction in the range of between 5 and 1000 Å and a distribution on said support element of no more than 0.2 of said square meter ($m^2$) of exposed nickel/square meter ($m^2$) of support surface.

Preferably, said support element is selected from the group comprising alumina and zeolite and other suitable supports having equivalent physical characteristics.

Preferably, said support element comprises alumina and average size of said Ni crystallites is in the range of between 150 Å and 250 Å and a distribution of said Ni crystallites on said support element of no more than 0.14 $m^2$ of nickel/$m^2$ of said support with an average pore size between 1000 Å to 10000 Å, and a specific surface area of less than 10 $m^2$/gram (g) of catalyst.

Preferably, said support element comprises alumina and said average pore size is in the range of between 2000 Å and 5000 Å and a distribution on said support element of no more than 2 of said $m^2$/gram (g) of catalyst.

Preferably, said support element comprises zeolite and said average zeolite cage size is in the range of between 5 Å and 100 Å and a specific surface area of 1000 of said $m^2$/g.

Preferably, said support element comprises zeolite and said average size is in the range of between 5 Å and 20 Å and a distribution on said support element of no more than 500 of said $m^2$/g. Preferably, said zeolite is selected from the group consisting of sodium exchanged Y type zeolite (NaY) and ultrastabilized Y type zeolite (USY).

Preferably, said support element has an average zeolite cage size in the range of between 11 Å and 14 Å.

Preferably, said suitable support element has an average size in the range of between 12 Å and 13 Å.

Broadly the present invention also relates to a reforming process comprising reforming hydrocarbons in the presence of a catalyst in a reaction zone, said catalyst being Nickel (Ni) catalyst of discrete Ni crystallites formed on a support element by a several step incipient wetness process, said crystallites having an average size measured in any one direction in the range of between 5 and 1000 Å and a distribution on said support element of no more than 0.2 of said square meter of nickel exposed metal square meter of support selected from the group consisting of alumina and zeolite materials, recycling said catalyst to and from said reaction zone, regenerating between 10 and 100% of the catalyst being recycled in a regeneration zone to provide a regenerated catalyst and returning said regenerated catalyst to said reaction zone.

Preferably said support comprises zeolite and said reforming process is a dry reforming process.

Preferably said support comprises alumina and said reforming process is a steam reforming process.

BRIEF DESCRIPTION OF THE SEVERAL VIEWS OF THE DRAWING(S)

Further features, objects and advantages will be evident from the following detailed description of the preferred embodiments of the present invention taken in conjunction with the accompanying drawings in which.

DETAILED DESCRIPTION OF THE INVENTION

Figure 1:
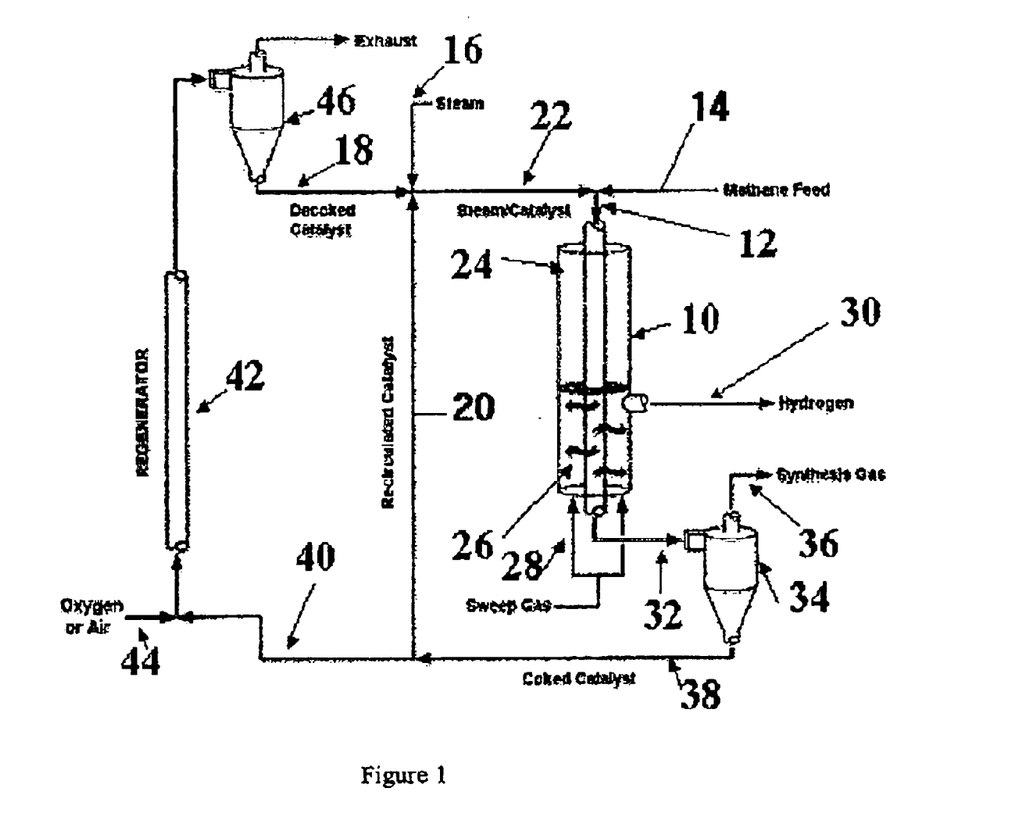
FIG. 1 is a schematic illustration of a process for steam reforming of methane using a down flow methane reactor and an up flow catalyst regenerator.
Figure 2:
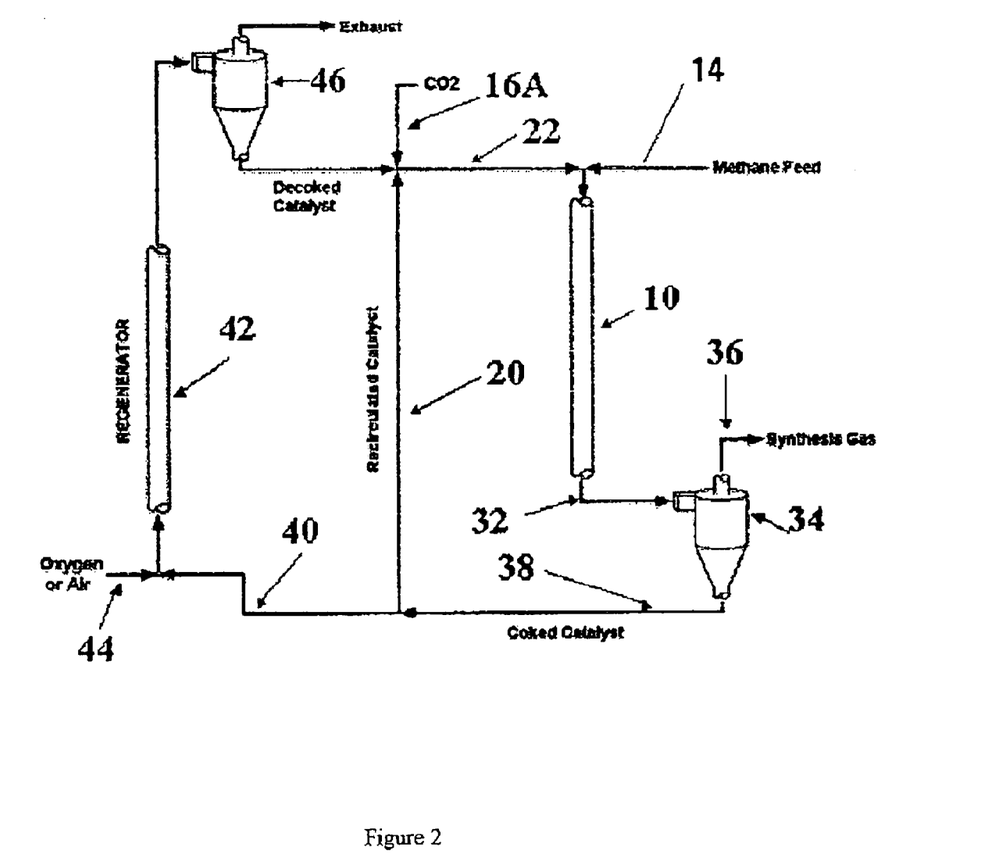
FIG. 2 is a schematic illustration of a process for dry reforming of methane using a down flow methane reactor and an up flow catalyst regenerator

Before describing the improved catalyst of the present invention attention is directed to FIGS. 1 and 2 which illustrate a steam reforming process in which the Ni alumina catalyst of this invention are very effective and a dry reforming process for which the Ni zeolite catalysts of the invention are particularly suited. As shown in FIG. 1 the process uses a reactor 10 which in the illustration is in the form of a Catformer 10. and into the top of which the steam, catalyst and methane are introduced via line 12. In the illustrated arrangement the methane is introduced to the system via line 14, the steam via line 16 and the catalyst is provided in the form of decoked catalyst in line 18 and recirculated catalyst via line 20. The steam, decoked catalyst and recirculated catalyst pass together via line 22 to line 12 and are introduced to the reactor 10 in this manner.

The reactor 10 has an upper primary section 24 and a lower secondary section 26. Sweep gas is introduced at the bottom of the reactor 10 i.e. into the secondary section 26 as indicated by the arrows 28. Hydrogen gas leaves the reactor 10 adjacent to the top of the secondary stage as indicated by line 30. The synthetic gas produced in the reactor 10 plus some coked catalyst leave via line 32 and are separated in the cyclone separator 34 with the synthetic gas being available from line 36 and the coked catalyst being returned via line 8 some of which is recirculated via line 20 and the remainder of which passes via line 40 to the regenerator 42 where it is oxidized via oxygen or air introduced as indicated at 44. Gases are separated from the decoked catalyst in separator 46 and the decoked catalysis returned via line 18 as above described.

The dry reforming process or $CO_2$ reforming shown in FIG. 2 is similar to that of FIG. 1, however the line 16 introducing steam in FIG. 1 is replaced by a line 16A introducing carbon dioxide ($CO_2$) in place of the steam. The remainder of the process is quite similar to the steam process of FIG. 1.

The present invention provides improved catalyst for use in either steam or dry reforming processes. Some may be used in both the steam and dry processes and some are restricted to the dry process because or their intolerance to steam at high pressure.

In general the important properties of catalysts are tailored so that the catalysts fulfill the following criteria: a) stable at high temperature and steam partial pressure (if it is intended to be used in a steam reforming process), b) mechanically strong, c) resistant to the coking, d) minimal support/metal interaction, e) suitable catalytic activity and f) fluidizable (if the catalyst is to be used in a fluidized bed type process).

With the above factors in mind, Nickel (Ni) was chosen to be used as the active metal as it will provide suitable activity, be cost effective and aid in the ease of comparison between the proposed process and current industrial practice.

An additional feature of the catalysts of the present invention is their stability when exposed to repeated oxidation and reduction cycles, so that the catalyst may be effectively revitalized and its effectiveness substantially restored so that even after a substantial number of restoration cycles its efficiency remains high.

Support structures may be made of a number of conventionally used suitable support materials, however it has been found that alumina or zeolite materials are particularly effective and thus suitable supports will generally have similar physical characteristics to the alumina or zeolite materials preferred for this invention. Supports made from alumina, preferably α-alumina have been found to be effective for both the steam reforming processes the dry reforming processes. Zeolite support structure are not particularly suited to steam reforming as the high pressure steam used in this process has been found to be detrimental to the zeolites, but zeolite support structures particularly NaY [sodium exchanged Y type zeolite] and USY [ultrastabilized Y type zeolite]support structures have been found to be very effective in a dry reforming process.

The present invention is based on the finding that the crystallite size of the catalyst metal (nickel Ni) crystallites and the distribution of these catalyst crystallites on the support structure are particularly important to both the effectiveness of the catalyst in the reforming process and in the rejuvenation of the catalyst after use by minimizing agglomeration of catalyst crystallites i.e. growth of crystallite size during the rejuvenation stage.

Figure 3:
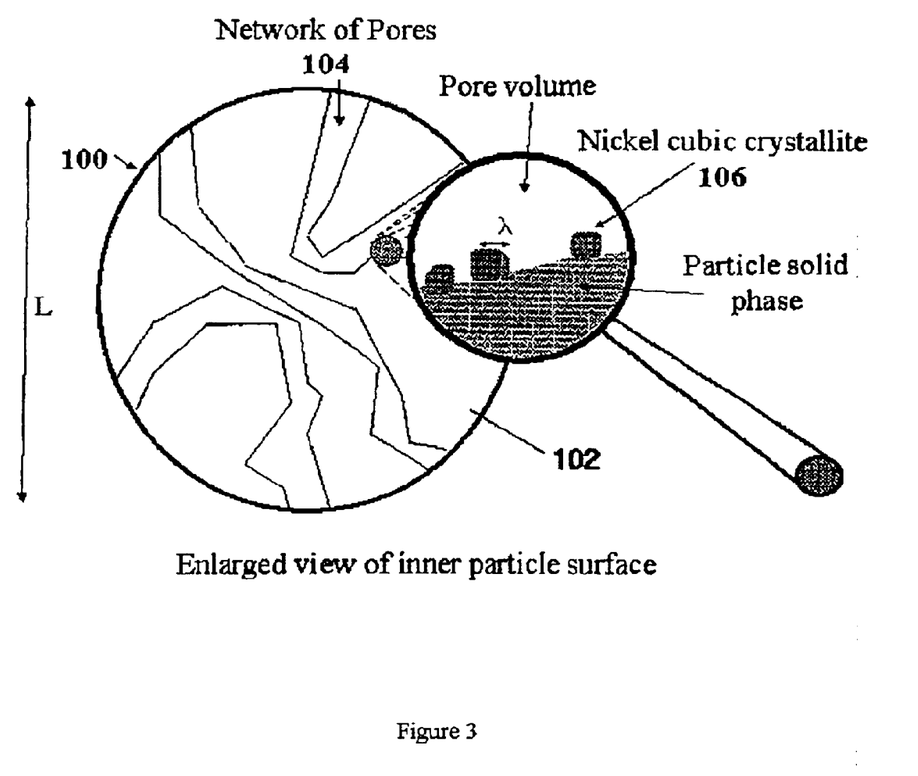
FIG. 3 is a schematic illustration of a of a catalyst formed in accordance with the invention showing at one side an enlarged view of the Ni crystallite

FIG. 3 is an example of a catalyst constructed according to the invention. As shown the catalyst 100 includes a support 102 has a major dimension L which may range in size from 5 to 200 microns and is formed with a network of internal pores 104. A plurality of catalyst material crystallites (Ni crystallites) 106 are positioned in spaced apart relationship with the minimum space between adjacent crystallite or maximum nickel surface coverage of 0.2 square meters ($m^2$) of exposed nickel/square meter ($m^2$) of support The crystallites have a characteristic dimension as indicated at "1". This dimension "1" will be discussed in more detail below.

It has been found that the size range characteristic dimension "1" for the Ni crystallites should be in the range of 5 Å to 1000 Å and preferably are in the range of 150 to 250 Å These crystallites 106 are distributed on the support 102 so that there are no more than 0.2 $m^2$. of exposed nickel/$m^2$ of support i.e. a minimum spacing between adjacent crystallites or maximum coverage of the spice support.

The average range of size i.e. dimension 1 of the crystallites 106 when α-alumina (the preferred form of support for steam reforming) is used as the support structure will generally be in the range of 10 Å to 1000 Å preferably 150 Å to 250 Å and for zeolite supports will normally be smaller than those for α alumina and generally will be in the range of 5 Å to 100 Å preferably 30 Å to 70 Å. It has been found that when the size and distribution of Ni crystallites are not within these ranges the resulting product has catalytic properties significantly inferior to those of the present invention.

Figure 6:
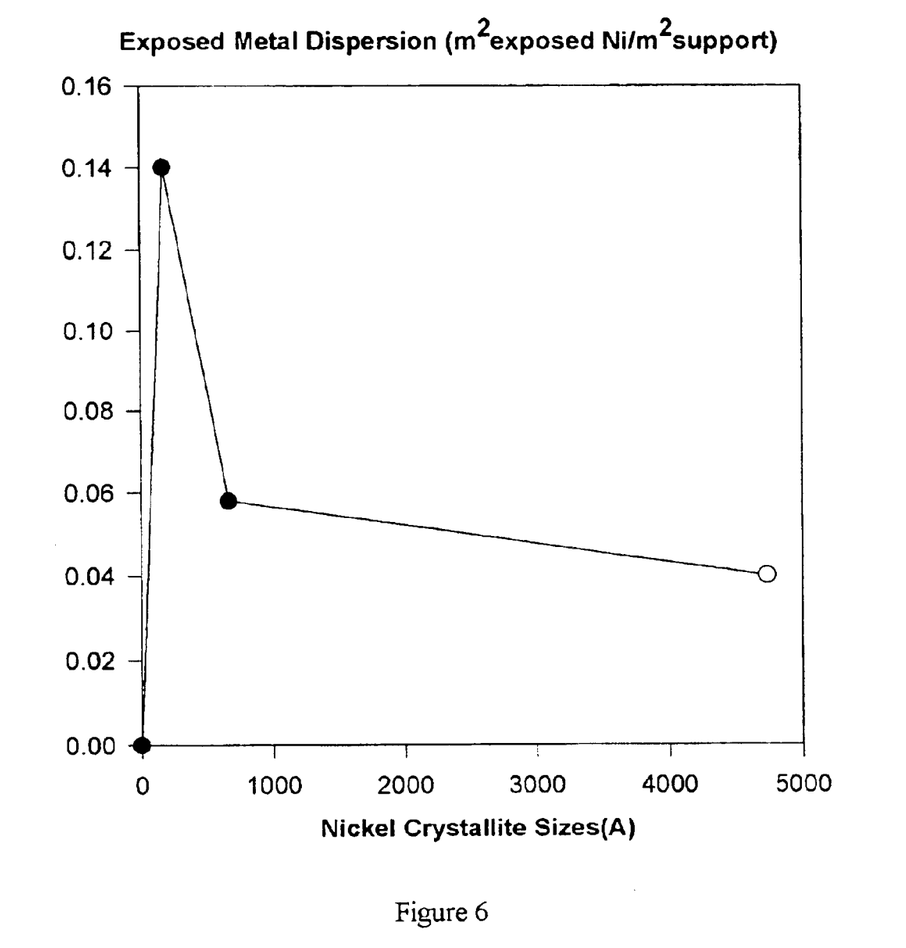
FIG. 6 is a plot of exposed metal dispersion versus crystallite size.

Attention is directed to FIG. 6 which shows the relationship of crystallite size in A versus exposed Ni surface/unit of support area. It is very clear that the maximum ratio is obtained at a crystallite size of about 250 to about 350 Å.

It will be noted that the crystallites have a normal size distribution. The values presented were measure with chemisorption to obtain the average value.

The catalyst is particularly suited for fluidized bed use as it may be provided in the form of fluidizable catalyst crystallites having a size L of between 5 and 200 microns and preferably between 20 to 100 microns. and an apparent density in the range of 0.5 to 2 $Kg/m^3$ preferably of 0.7 to 1.3 $Kg/m^3$.

The particle size is measured using a laser particle size analyzer. Surface area which is in fact inner surface area because inner surface is much larger than external surface area is measured with a specific surface area analyzer (BET method).

Where the catalyst is to be used in a process where regenerating of the catalyst is to be employed it is important the effectiveness of the catalyst be maintained and that the Ni crystallites do not agglomerate in the process.

It is clear that to practice the present invention and provide a catalyst with the required crystallite properties care must be taken in the manufacture of the catalyst to ensure the desired small crystallite size of the Ni is obtained It has been found that to provide crystallites having the required characteristics it is essential they be formed on the support by a multi step incipient wetness process as will be described in more detail below.

The Preparation of a Preferred Form of Fluidizable Catalyst of the Present Invention Three steps were used in the catalyst preparation process for the preferred forms of the catalysts of the present invention namely: 1) impregnation of the support structure with desired content of nickel under vaccum, 2) drying and calcinations of the particle, 3) reduction of nickel to the metallic state ($Ni^0$), and 4) in the case of the zeolites, spray drying in a matrix to produce crystallites dispersed in a 60–70 $\mu$m matrix range.

The impregnation of the α-alumina and Y-type zeolite supports was accomplished using the incipient wetness technique. This technique requires that the catalyst pores first be degassed under vaccum conditions. This was done by placing samples of the catalyst in a quartz flask under vacuum (250 mmHg). Once degassed, the vacuum was maintained and aliquots of Ni $(NO_3)_2$ solution (50-wt % Ni $(NO_3)_2$ in distilled water) were introduced under continuous mixing until a thin layer of supernatant liquid covered the crystallites.

After impregnation the catalyst was heated at a rate of 0.5° C. to 140° C. and allowed to dry for 6 hours. Once the solution evaporated the crystals $Ni(NO_3)_2$ were formed and deposited in the inner surface of the catalyst. Following this the catalyst was placed in a fluidized bed reactor located in a vertical tube furnace and fluidized with a 10% hydrogen 90% helium gas mixture. Over four hours, the temperature of the bed was raised from ambient to 450° C. and held there for two additional hours. This treatment had the effect of thermally decomposing the monoclinic crystals of $Ni(NO_3)_2 \cdot 6H_2O$ into the cubic crystals of NiO and $HNO_3$ and reducing the NiO produced to cubic $Ni^0$ crystals.

The number of impregnation/thermal decomposition cycles, required to reach the desired crystal size and metal dispersion (area of exposed nickel over the area of support), was determined by the extent of metals dispersion that could be reached in one impregnation. This in turn was dictated by the incipient wetness properties of the support. Typically, four cycles were required to reach a 0.14 $m^2$ of exposed nickel/$m^2$ of support having crystallite size of nickel of about 170 Å average size on α-alumina.

After impregnation to the desired metal loading level, the catalyst was calcined at 560° C. for 12 hours. When the calcination was complete, the catalyst was returned to the fluid bed/furnace and reduced at 450° C. for 4 hours in an atmosphere of 10% hydrogen balance helium. At this stage the Ni/α-alumina catalyst was ready for use in the reforming process (in this description methane reformation is particularly dealt with but it is believed the catalyst should have similar advantages in other hydrocarbon reforming processes for example biomass reforming).

In the testing of the present invention a TPD chemisoprtion technique was used for measurement of the Ni/NaY, Ni/USY crystallites see T., El Solh, Heterogeneous Catalyst for Methane Reforming, M.E.Sc. Thesis, University of Western Ontario, London, Ontario, 1998. Total bulk metal loading on catalyst crystallites after impregnation was assessed using Induced Coupled Plasma—Atomic Adsorption (AA-ICP) employing matrix matched standards. When the results of the AA-ICP were compared (Table 1) it was confirmed that incipient wetness impregnation technique reliably produced the desired metal loading without any losses of nickel as observed with other methods. Table 1 provides a comparison of nickel loading measured with atomic adsorption and SEM-EDX techniques; atomic absorption was used to provide the bulk composition of the catalyst; and SEM-EDX was used to measure the composition on the surface of pellets

TABLE 1

| Sample | Target Loading (wt. % Ni) | Measured Loading (wt % Ni) AA - ICP |
|---|---|---|
| 20% Ni/USY | 20 | 17.5 |
| 20% Ni/NaY | 20 | 14.6 |
| 20% Ni/α-alumina | 20 | 21.8 |
| 4% Ni/α-alumina | 4 | 3.47 |
| 2.5% Ni/α-alumina | 2.5 | 2.21 |
| 1% Ni/α-alumina | 1 | 0.58 |

It is apparent that the crystallite size of the Ni when the catalyst is constructed as described is in part dependent on the size of the crystallites of the catalyst on the support. It is also obvious that the crystallite size of the Ni on the zeolite support is significantly smaller than the crystallite size of the Ni on the α-alumina support.

The Performance of the Fluidizable Catalyst of the Present Invention Under Reaction Conditions Catalyst activity was assessed in a bench scale unit specifically designed for the simulation of fast fluidization (riser or downer operation) called the CREC Riser Simulator which is described in more detail in U.S. Pat. No. 5,102,628 the disclosure of which is in incorporated herein by reference. Reactions in the Riser Simulator are carried out in a batch fashion by injecting the reactants, actively mixing the reactor and then terminating the reaction by venting the contents to a sample bottle see K., Jarosch, H. I., de Lasa, "Novel Riser Simulator for Methane Reforming using High Temperature Membranes", Chem. Eng. Sci., vol54, pg. 1455, 1999 for further information. Catalyst activity was assessed for measuring steam reforming by measuring the conversion of methane at fixed contact times (30 and 60 seconds (s)) under standard conditions (750° C., Steam/methane ratio~2.3, C/O=6.0, Total Pressure 2200 kPa).

The nickel crystallites were smaller for USY and NaY zeolites, 60 Å and 40 Å respectively over the crystallites on α-alumina (179 Å) and for this reason it was anticipated that the zeolite-based catalysts would be more active than the α-alumina catalysts. However, when the conversion of methane at 60 seconds (s) was compared, the α-alumina based catalyst was found to be more active. A methane conversion of 51%, close to the equilibrium conversion, was observed over the α-alumina while the conversion of methane observed over the NaY zeolite was only 35%.

Furthermore, when the activity assessment was repeated it was found that over a time-on-stream of 360 s, the activity of the NaY zeolite based catalyst declined dramatically, falling from 35% to 13%, while that of the α-alumina remained relatively stable. A similar loss of activity was noted over nickel/USY catalysts. The loss of activity observed over the Y-type zeolites was found to be due to the high steam partial pressures used (>1700 kPa) [7].

Therefore, although useful for the production of high and stable metal dispersions, Y-type zeolites were found unsuitable for the steam reforming of methane. However, nickel supported on zeolites can be, as described later, very valuable catalysts for dry methane reforming (methane reforming with $CO_2$) as reforming takes place in an atmosphere that is essentially steam free, thus preserving the structure of the zeolites.

Figure 5:
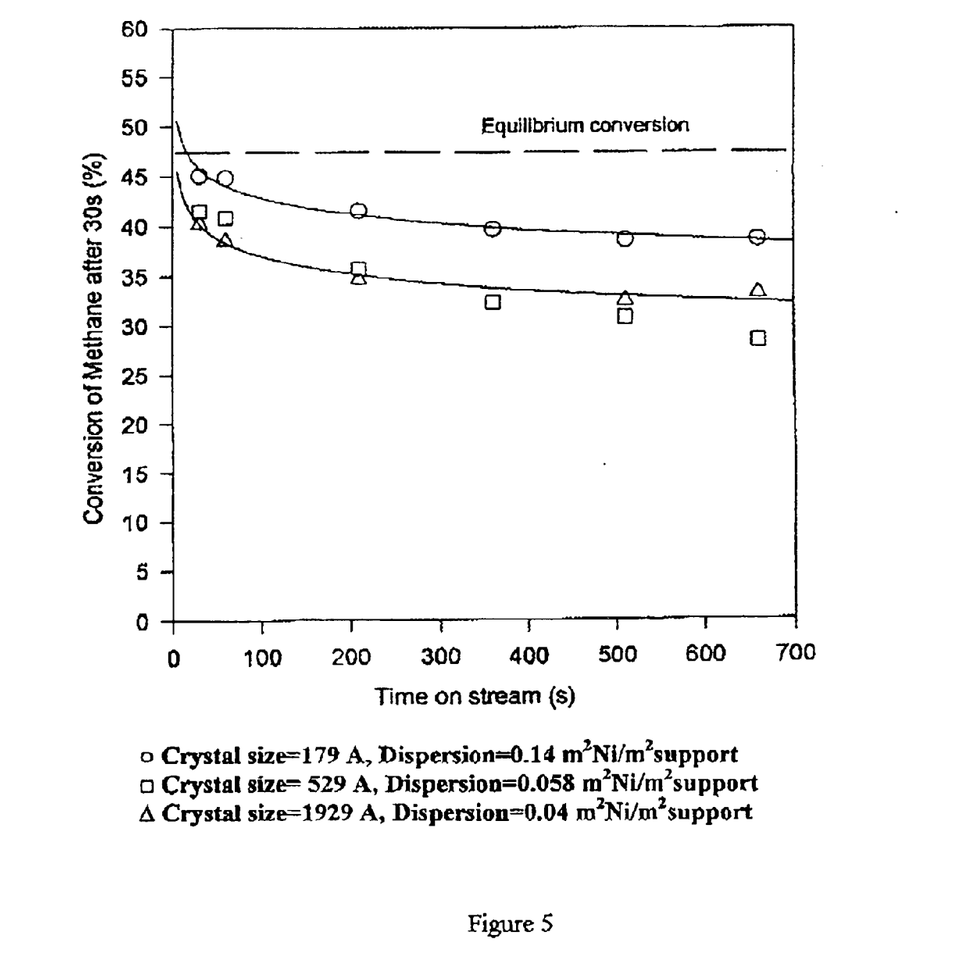
FIG. 5 shows a plot of methane, conversion as a function of time for a plurality alumina support catalysts with different Ni crystallite sizes.

Optimum Loading for a Nickel Alumina Supported Fluidizable Catalyst of the Present Invention for Steam Reforming Having established that the Y-type zeolites were unsuitable for use in the steam-reforming version of the Catformer, attention was focused on the nickel α-alumina catalyst. Experiments were conducted using α-alumina impregnated with 179 Å average size crystallites and 0.14 $m^2$ exposed nickel/$m^2$ of support, 529 Å average size crystallites and 0.058 $m^2$ of exposed nickel/$m^2$ of support and 1929 Å average and 0.04 $m^2$ of exposed nickel/$m^2$ of support in order to determine the effect of crystallite sizes and time-on-stream on activity (FIG. 5). In this case, the activity was measured as the conversion of methane after a 30 s contact time as conversions close to equilibrium were observed after 60 s over 1929 Å average size crystallites and 0.04 $m^2$ of exposed nickel/$m^2$ of support on α-alumina catalyst.

Figure 4:
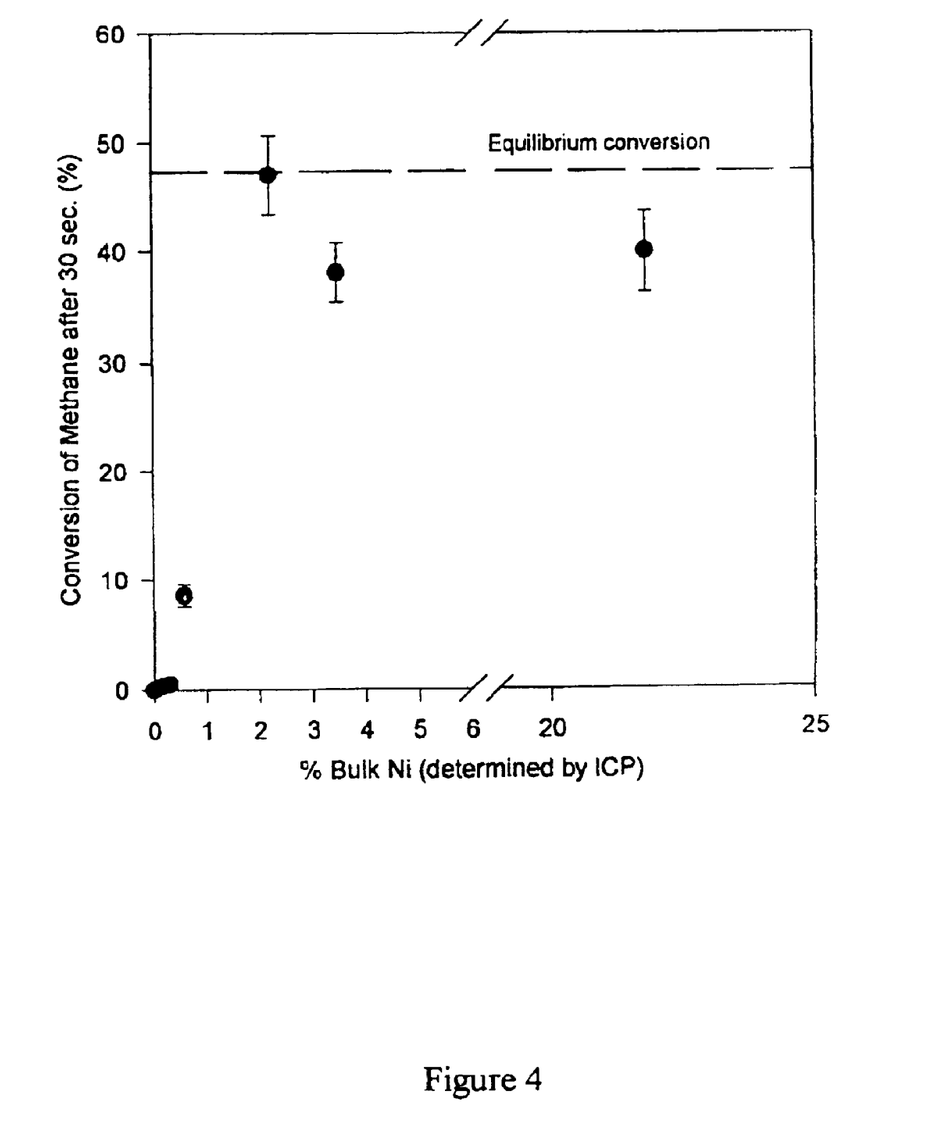
FIG. 4 is a plot of methane conversion as a function of nickel loading on the nickel on α-alumina fluidizable catalyst of the present invention.

As previously mentioned, 179 Å average size crystallites and 0.14 $m^2$ exposed nickel/$m^2$ of support, 529 Å average size crystallites and 0.058 $m^2$ of exposed nickel/$m^2$ of support and 1929 Å average and 0.04 $m^2$ of exposed nickel/$m^2$ of support nickel encompassed the low and high values of metal loading on conventional reforming catalysts, and it was felt that these catalysts would bracket the optimal metal loading level. However, when the activity of these two loadings were compared, 39.5±3.7% for the 179 Å nickel crystallites and 38.9±2.3% for the 529 Å nickel crystallites it was found that the difference in activity was not statistically significant. When the metal loading was decreased to 179 Å nickel crystallites, the activity increased and the conversion of methane was found to be 46.9+4.0%. Further reduction of the metal loading level led to a sharp drop in catalyst activity. These results are shown in FIG. 4 in which the broken line represents the methane equilibrium conversion for thermodynamic calculations. In generating this plot the contact time in Riser Simulator=30 s, Catalyst cycle First, Temperature=750° C., $H_2O$/Methane=2.2, Pressure= 2.2 MPa El.

Further results showing the effectiveness of the Ni α-alumina for the present invention over time have been plotted in FIG. 5. Similar result are shown for USY zeolites in FIG. 8.

Characterization of the Catalyst of the Preset Invention

As already stated, in the Catforming and other methane reforming processes, some fraction of the catalyst will normally be regenerated and this regeneration process will involve the metallic component of the catalyst cycling between oxidation and reduction. As this is the case, the stability of the catalyst when exposed to repeated cycles of oxidation and reduction is important. Exposure to repeated cycles of oxidation and reduction generally has two primary effects on the catalyst: a) formation of non-reducible species due to metal/support interactions (reducibility), b) growth in size (redispersion) of the metal crystals. Each of these processes can lead to loss of catalyst activity via reduction of the available metal surface area.

The effect of the number of oxidation and reduction cycles on the reducibility and dispersion/crystal size of the nickel was assessed in the same manner for both the zeolite and α-alumina supports. Each complete cycle was composed of a reduction stage, a chemisorption stage and an oxidation stage. At the start of each cycle, the reducibility was assessed by measuring the hydrogen uptake during temperature-programmed reduction (TPR). After each TPR, pulse chemisorption of hydrogen was employed to assess the dispersion/crystal size of the nickel. The cycle was then completed by temperature-programmed oxidation (TPO) of the catalyst sample. TPR, TPO and chemisorption were performed using a Micromeritics TPD/TPR 2900. The results of these experiments are reported in Table 2.

TABLE 2

Changes of Ni dispersion on the support with oxidation - reduction cycles.

| Ni Crystallite size | Run 4 | Run 5 | Run 6 |
|---|---|---|---|
| 179 Å | 0.14 | 0.167 | 0.136 |
| 529 Å | 0.058 | 0.068 | 0.0443 |
| 1929 Å | 0.04 | 0.049 | 0.0277 |

Table 3 summarizes the results of the BET tests for nickel catalyst supported on both α-alumina and zeolites. Specific surface areas were found to be 603 $m^2$/g and 422 $m^2$/g for the NaY and the USY respectively with a coefficient of variation for each measurement of 6%. BET measurements were valuable to define changes in specific surface area with every step of catalyst preparation or use. For instance, it was observed that the impregnated zeolites had a lower specific surface area, 307 and 395 $m^2$/g, than the zeolites prior to impregnation that had specific surface areas of 603 and 422 $m^2$/g, respectively. This confirmed the expectation that the impregnated nickel presumably blocked some of the pores of the zeolite network. Note that this effect was particularly evident for the impregnated Ni on NaY, where the surface area decreased almost 50% with respect to the original area prior to impregnation. However, after the catalysts were reduced, surface areas increased to 510 and 458 $m^2$/g, for the NaY and USY respectively. Nickel reduction leads to changes in the characteristic dimensions in nickel crystals. These changes are expected to be about 35%, in nickel deposited in the extra-framework cracks and about 15% or about 1.1A, in the super-cages. This result is most likely the consequence of the volume change when 1 mole of NiO is reduced to Ni, with the expected volume reduction given by the group $$\frac{MW_{Ni}}{MW_{NiO}} \times \frac{\rho_{NiO}}{\rho_{Ni}}$$

with this group being 1.53 times. Thus, the contraction of nickel deposited opens new paths for accessing surface area. In addition, the prepared catalysts were tested in the Riser Simulator under steam partial pressures of up to 1724 kPa in order to test the resistance of the zeolite at the conditions close those of the industrial steam methane reforming process. Results demonstrated that under these conditions the zeolites structure collapsed. The surface area of the zeolite catalyst after use under these conditions was below the detection limit (<3 $m^2$/g).

TABLE 3

Changes in catalyst surface area as measured via BET for various treatment steps

|  | Catalyst | | |
|---|---|---|---|
| Sample Treatment | NaY Zeolite ($m^2$/g) | USY Zeolite ($m^2$/g) | α-alumina ($m^2$/g) |
| Support free of Ni (before impregnation) | 603 | 422 | 7 |
| 20 wt % Ni on listed support | 307 | 395 | <3 |
| 20 wt % Ni - Reduced at 450° C. | 510 | 458 | <3 |

TABLE 3-continued

Changes in catalyst surface area as measured via BET for various treatment steps

| Sample Treatment | Catalyst | | |
|---|---|---|---|
| | NaY Zeolite ($m^2/g$) | USY Zeolite ($m^2/g$) | α-alumina ($m^2/g$) |
| 20 wt % Ni - Steamed at 276 kPa & 750° C. | <3 | <3 | <3 |
| 20 wt % Ni - Steamed at 1724 kPa & 750° C. | <3 | <3 | <3 |

This table show that the zeolite structure, with a characteristic large surface area) after steaming and under conditions close to the steam reforming reaction is lost. This fact is also confirmed using XRD(x-ray diffraction). This demonstrates that nickel on zeolite catalyst are only adequate for dry methane reforming.

It is apparent that dispersion of the Ni on the support α-alumina, as shown in Table 2, remained substantially constant for the 179 Å average crystallites but changes significantly at the higher loadings shown The surface area of the α-alumina was found to be 7 $m^2/g$ prior to impregnation and 3 $m^2/g$ after impregnation. These results show a much lower surface area for the α-alumina compared to that of the zeolite, Unfortunately, given the limitation of the available BET unit to measure the surface area below 3 $m^2/g$, surface area could not be employed to describe the structural changes of α-alumina with steaming or reduction/oxidation conditions.

The behavior of the catalytic activity with time-on-stream behavior was assessed using a contact time of 30 seconds as a basis over a total time-on-stream of 760 s for the 2.5, 4.0 and 20 wt % nickel/α-alumina catalysts. As expected all three catalyst formulations experienced a loss of activity with time-on-stream, however, unlike the Y-type zeolites, the activity of α-alumina catalysts was asymptotic. The exact mechanism underlying the changes in activity is not clear, however, activity loss is likely related to hydrogen promoted re-dispersion of the nickel as changes were noted only when catalyst samples were exposed to reacting atmospheres. Consequently, given the reported results, it can be concluded that the 179 A average size nickel crystallites nickel on α-alumina catalyst could be used in the Ca former unit configuration with only a fraction of the catalyst being regenerated (reheated), perhaps ¼, while the rest of the catalyst being recycled back directly to the Catformer unit for another steam reforming cycle.

Thus, based on the activity results for the nickel supported on α-alumina catalysts, it is clear that 179 A average size nickel crystallites with a 0.14 m2 of nickel exposed/m2 of support appears to be close to the optimal catalyst design conditions. It should be emphasized that this average nickel crystallite sizes obtained with a 2.5 wt % nickel and using a multiple step incipietness technique is much smaller than bulk metal loading levels in use on commercial catalysts (14–20 wt %).

Nickel Zeolite Supported Fluidizable Catalyst for Dry Reforming.

Figure 7:
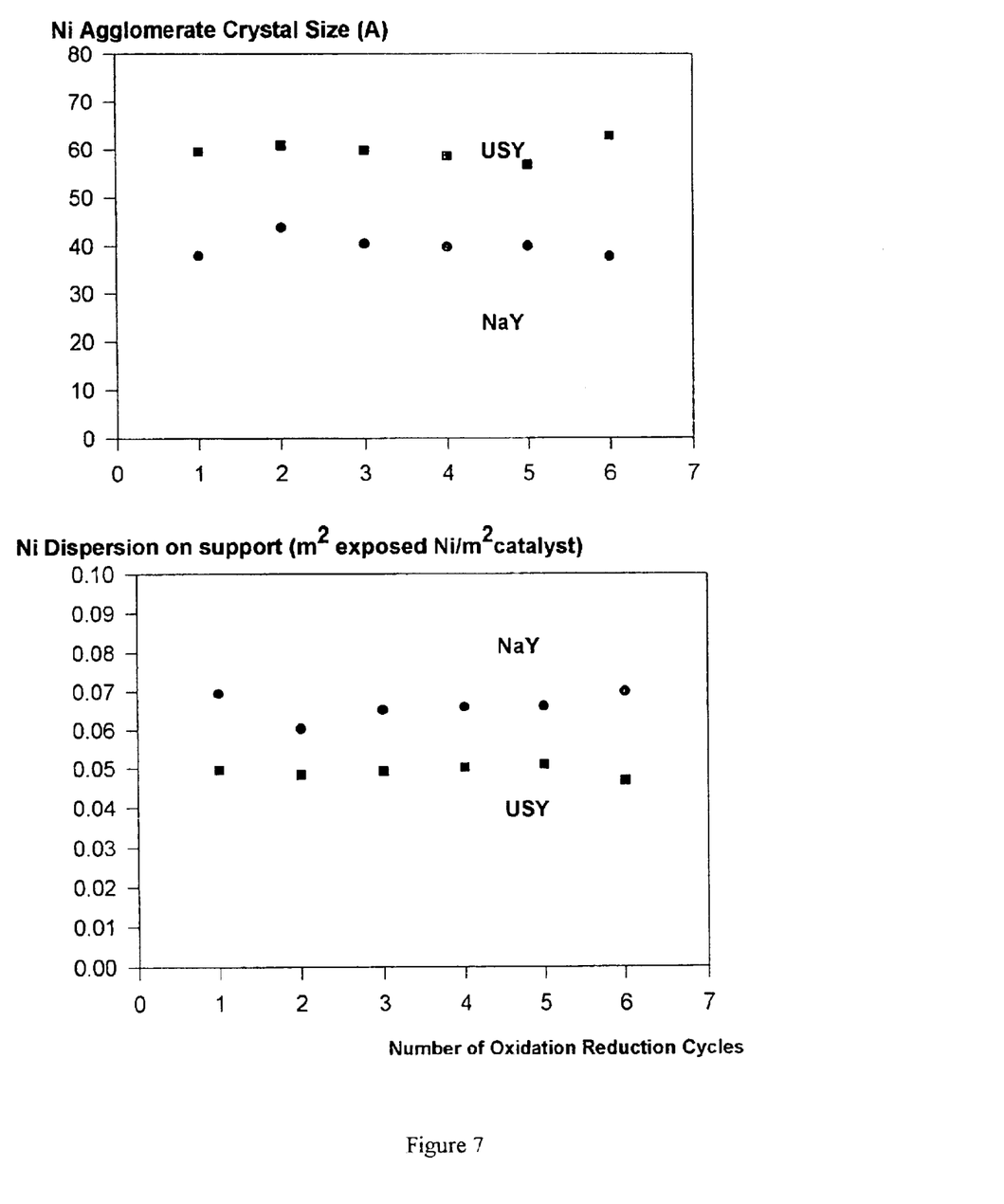
FIG. 7 is a plot showing the effect of recycling on crystallite size and dispersion.

As above indicated, NaY and USY zeolites provide high dispersion and reducibility of nickel. Dispersion and reducibility were found to be higher for nickel deposited on NaY zeolite (0.07 $m^2$ of exposed nickel/$m^2$ of support ±2% and 70±1%) than for nickel deposited on USY zeolite (0.05 $m^2$ of exposed nickel/$m^2$ of support ±0.5% and 56±2%). In both cases the reducibility and dispersion were stable when the catalysts were exposed to repeat oxidation/reduction cycling (FIG. 7). The nickel crystal sizes are comparable to the size of the Y zeolite supercages. It can be thus, argued that nickel remains locked or partially locked in the supercages of the zeolites preventing re-dispersion or agglomeration when being subjected to oxidation-reduction cycles.

Attention is directed to FIG. 7 which clearly show that over the various recycles the size of the Ni crystallites and their distribution on the support structure did not change significantly over the 6 recycles tested.

Thus, nickel-zeolite formulations are promising given that materials with these characteristics can provide catalysts with much larger metal surface area given the same loading of nickel. Thus, the Ni-zeolite fluidizable catalyst of the present invention can be a very attractive alternative given the significant nickel savings.

Figure 8:
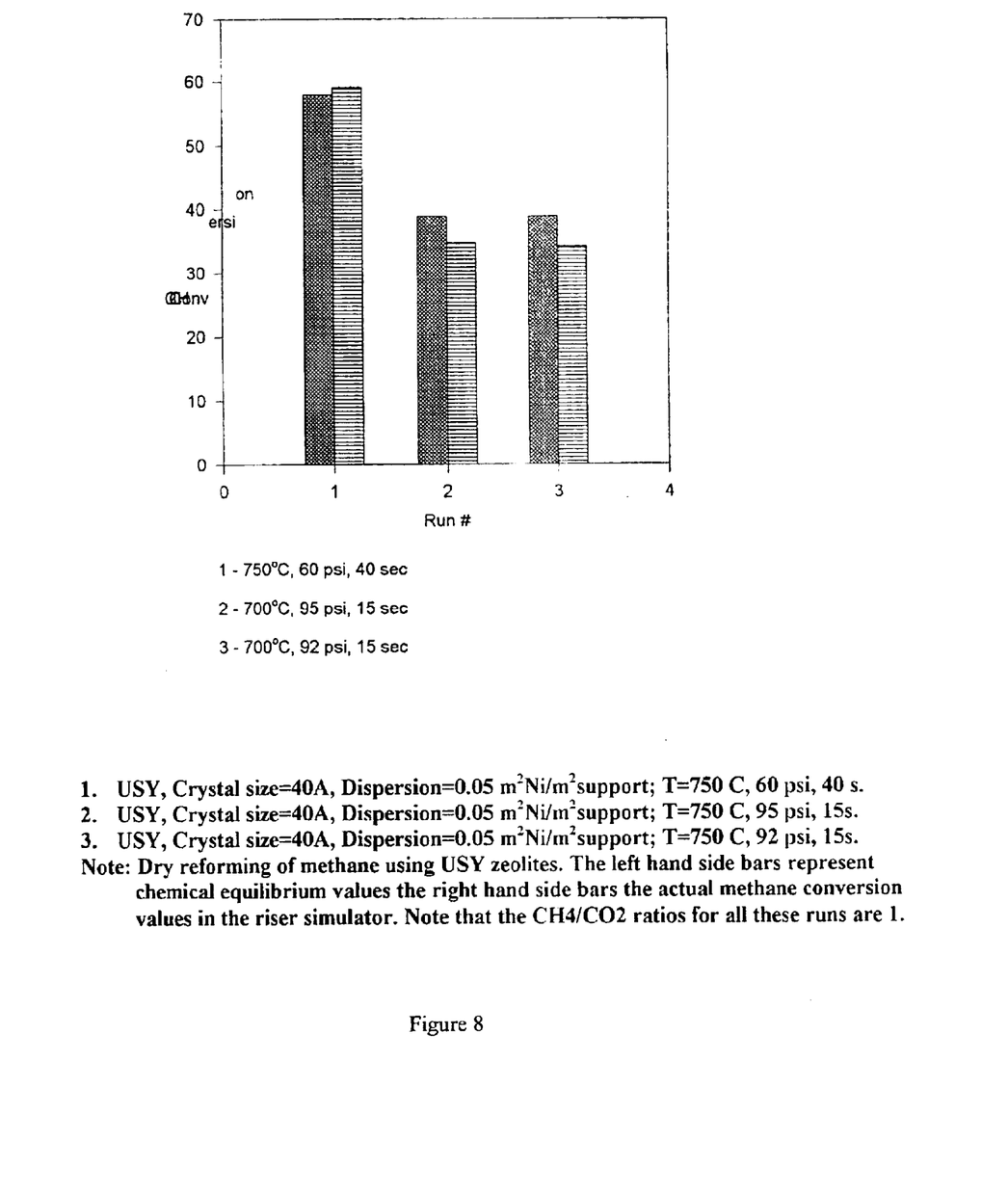
FIG. 8 is a bar diagram comparing the effectiveness for dry reforming of the present invention with theoretical chemical equilibrium conversion.

It is believed that nickel-zeolite catalysts could be a very attractive alternative as the basic catalyst formulation for $CO_2$ ('dry') reforming of hydrocarbons particularly methane, a process in which steam is absent or is present at low partial pressures. The reactivity results obtained with the Ni-zeolite fluidizable catalysts of the present invention in the CREC Riser Simulator were very successful (FIG. 8). It was shown that at 600 KPa, 750–800° C., 10–15 seconds reaction time, a 60% methane conversion could be reached for a 0.33 to 2 $CH_4/CO_2$ ratio and all this with low coke selectivity.

Regarding coke formation, it appears to become a serious problem only when methane/$CO_2$ ratio is greater than 2. It has to be emphasized that there was no indication throughout the runs of zeolite collapse or effects of steam on the zeolite structure under the operating conditions of dry reforming.

Thus, on this basis it was concluded that the nickel-zeolite fluidizable catalyst of the present invention could be employed effectively for the dry reforming of methane especially if the $CH_4/CO_2$ ratio remains below 2.

Having described the invention, modifications will be evident to those skilled in the art without departing from the scope of the invention as defined in the appended claims.

We claim:

1. A regenerable Nickel (Ni) catalyst for a hydrocarbon reforming process, said catalyst comprising discrete Ni crystallites formed on at an alumina support element by a several incipient wetness steps process incorporating a plurality of Ni impregnation cycles, said catalyst being capable of withstanding at least 6 catalyst regenerations without significantly inhibiting it's catalytic activity in said reforming process, said Ni crystallites positioned in the inner surface of said support element, said crystallites having a crystallite characteristic dimension of between 150 and 250 Å and a dispersion on said support element of no more than 0.14 square meter of exposed nickel/square meter of support surface.

2. A catalyst as defined in claim 1 wherein said alumina is α alumina.

3. A catalyst as defined in claim 1 wherein said support element has an average size is in the range of between 5 and 200 microns.

4. A catalyst as defined in claim 1 wherein said support element has an average size in the range of between 20 and 100 microns.

5. A catalyst as defined in claim 1 wherein said Ni crystallites are present in the amount of up to 20 wt %.

* * * * *

UNITED STATES PATENT AND TRADEMARK OFFICE
CERTIFICATE OF CORRECTION

PATENT NO. : 6,852,668 B2
DATED : February 8, 2005
INVENTOR(S) : de Lasa et al.

It is certified that error appears in the above-identified patent and that said Letters Patent is hereby corrected as shown below:

<u>Title page,</u>
Item [75], Inventors, second inventor's name should read -- Tarek Elsoth --.

Signed and Sealed this

Sixth Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 6,852,668 B2  
APPLICATION NO. : 09/998222  
DATED : February 8, 2005  
INVENTOR(S) : de Lasa et al.

Page 1 of 1

It is certified that error appears in the above-identified patent and that said Letters Patent is hereby corrected as shown below:

Title page,
Item [75], Inventors, second inventor's name should read -- Tarek Elsolh --.

This certificate supersedes Certificate of Correction issued June 6, 2006.

Signed and Sealed this

Twelfth Day of September, 2006

JON W. DUDAS  
*Director of the United States Patent and Trademark Office*